Dec. 15, 1964  A. B. MUSICHUK  3,161,720
PORTABLE HIGHWAY REFLECTOR UNIT
Filed Aug. 14, 1961
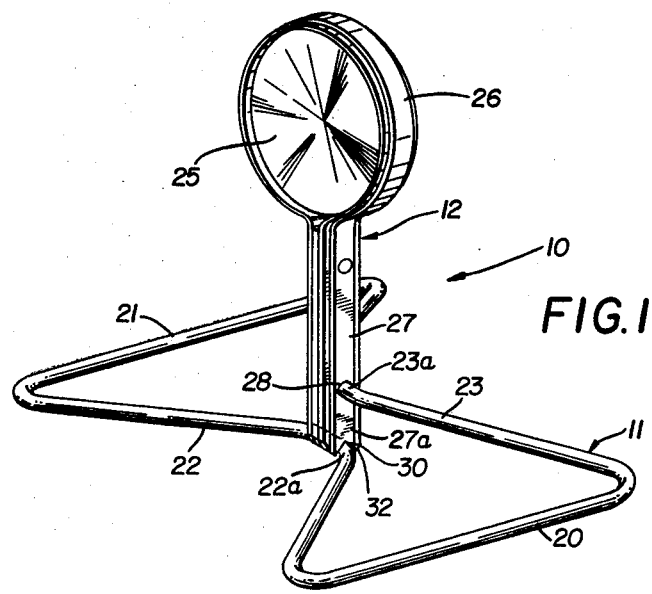
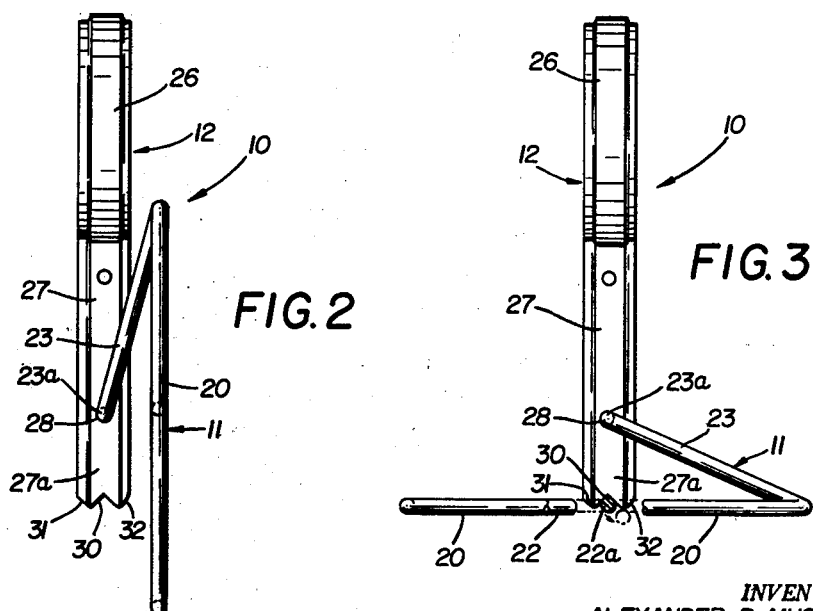
INVENTOR.
ALEXANDER B. MUSICHUK
ATTORNEY

United States Patent Office 3,161,720
Patented Dec. 15, 1964

3,161,720
PORTABLE HIGHWAY REFLECTOR UNIT
Alexander B. Musichuk, Tallmadge, Ohio, assignor to
Duncan-Morris Company, Akron, Ohio, a corporation
of Ohio
Filed Aug. 14, 1961, Ser. No. 131,206
5 Claims. (Cl. 88—79)

This invention relates to the art of portable reflectors, and in particular relates to an improved type of portable reflector unit adapted to be carried in the trunk of an automobile for use as an emergency signal during breakdown of an automobile, for example.

For several years past, motorists whose automobiles have broken down on the highway have indicated the existence of such emergency by the use of signal fuses that are placed several hundred feet in front of and behind the stalled vehicle so as to warn approaching motorists of the presence of the stalled vehicle and thus obviate the danger of having approaching automobiles collide with the same. While the use of such signaling fuses has been mandatory in the trucking business for a number of years, recent changes in legislation enacted in certain States, now permits the use of reflector units in lieu of fuses with such units being positioned ahead of and behind the car to serve the same function as previously served by the burning fuses.

As a result of the above mentioned change in traffic laws, there has now arisen a need for a portable low-cost type of reflector unit that can easily be stored in the car and that can further be folded into a compact unit so as to occupy a minimal amount of space during the normal period of non use thereof.

Additionally, and while the compactness requirements above discussed be met, it is also mandatory that such a unit be capable of being positioned in operating condition on any type of road surface, and further that the same be capable of being rapidly and quickly set up by the user so as to provide an immediate warning of the danger of a stalled vehicle ahead.

It has been discovered that the aforementioned requirements can be best met by producing a foldable type of reflector unit that includes a support frame that pivots with respect to a reflector unit, with the unit being arranged so that the reflector unit can be pivoted between its flat condition of storage and an upright condition which is designed for signaling use during road emergencies.

It has been further discovered in connection with the production of such an item as above described, that best results will be achieved if the unit is provided with a locking mechanism that serves to lock the reflector unit in an upright condition during its periods of use.

Production of a light-weight, compact and instantly usable reflector unit having the above described characteristics, accordingly becomes the principal object of this invention, with other objects becoming more apparent upon a reading of the following brief specification, considered and interpreted in the light of the accompanying drawings.

Of the drawings, FIGURE 1 is a perspective view of the improved reflector unit.

FIGURE 2 is an elevational view showing the unit in collapsed condition.

FIGURE 3 is a view similar to FIGURE 2 but showing the device in an upright position.

Referring now to the drawings, and in particular to FIGURE 1, the improved reflector unit, generally designated by the numeral 10, includes a support frame 11 and a reflector element 12, the arrangement being such that the reflector unit 12 is pivotally supported on the support frame 11 so as to be movable between the collapsed and upright position of FIGURES 2 and 3 respectively.

Referring again to FIGURE 1, and having particular reference to the support frame 11 it is to be noted that the frame 11 is of generally butterfly-configuration in plan, so as to include opposed side support elements 20 and 21, that are respectively interconnected by V-shaped elements 22 and 23, with the contour of these elements being such that the overall frame 11 is endless in outline form as clearly shown in FIGURE 1. The V-shaped elements 22 and 23 each include apex portions 22a and 23a which coact with the reflector element 12 will now be described.

Accordingly, and again referring to FIGURES 1 and 3, the reflector element 12 includes the usual circular reflector member 25 that is encircled by a circular frame member 26, with the opposed sides of the frame member 26 being disposed in adjacency to define an elongate handle 27 as clearly shown in FIGURE 1. The handle 27 is apertured as at 28, so as to be pivoted around the apex portion 23a to thus permit relative pivotal movement between the frame 11 and the reflector unit 12.

To the end of retaining the reflector unit 12 in the upright position if FIGURES 1 and 3, the lower end 27a of the handle 27 is provided with a notch 30, with the notch 30 being V-shaped so as to be received over the apex portion 22a and thus retain the reflector element 12 locked in the upright positions of FIGURES 1 and 3.

In the preferred embodiment of the invention shown herein, the apex portion 23a overlaps the apex portion 22a and in the normal condition of the frame 11 the spacing between the overlapped positions is considerably less than the space between the apertured 28 and the notch 30. In this fashion, when the notch 30 is positioned over the apex portion 22a there will have occurred a spreading apart of the apex portions 23a and 22a so that the inherent recovery properties of the frame 11 will constantly cause the apex portion 22a to be snugly engaged within the notch 30 so as to avoid disengagement between these elements during use of the reflector unit.

Because of the aforementioned tensional recovery properties, it has been further noted that preferred results will be obtained if the handle 27 is provided with cam means to facilitate engagement of the type shown in FIGURES 1 and 3. In this regard, attention is directed ot FIGURES 2 and 3 where cammed surfaces 31 and 32 are shown provided adjacent the notch 30 with these surfaces camming against the apex portion 22a to facilitate engagement of the type shown in FIGURES 1 and 3.

With reference to the material from which the improved reflector unit is made, the preferred form of the invention contemplates the use of aluminum due to the corrosive resistance properties of the same together with the overall lightness of the unit.

Accordingly, the frame 11 is shown made from aluminum rod stock while the handle 27 is made also of aluminum for the same reasons.

In use or operation of the improved reflector unit, the same will normally be carried in the flat condition of FIGURE 3. When it is desired to use the same, it is merely necessary that the user pivot the handle 27 relatively of the frame 11. As a result of such movement either of the cam surfaces 31 or 32, will strike the apex portion 22a to thus cause the apex portions 22a and 23a to be spread apart followed by a snapping into place of the apex portion 22a within the notch 30.

When this upright condition has been achieved, it is merely necessary that the unit be placed on the ground. And the same is then ready for an immediate and instantaneous use for the purpose of signaling in an emergency. During the time that the device is in use, it will be noted that the same is locked in place against accidental dislodging in view of the fact that apex portion 22a is consistently being urged into engagement with notch 30 by virtue of the inherent recovery properties of the frame 11.

When the period of use has been completed, the device can again be folded by merely pivoting the handle 27 of the reflector 12 ninety degrees with respect to the frame 11 whereupon the flat position of FIGURE 2 is once again achieved, at which time the device can be restored in the automobile awaiting further use as above described.

While a full and complete description of the invention has been set forth in accordance with the dictates of the patent statutes, it is to be understood that the invention not intended to be limited to the specific form shown herein.

Accordingly, modifications of the invention may be resorted to without departing from the spirit hereof or the scope of the appended claims.

What is claimed is:

1. A portable reflector unit of the character described, comprising; an endless resilient frame of generally butterfly configuration in plan and including opposed V-shaped segments whose apexes are disposed in substantially overlapped relationship with each other; a reflector unit having an elongate mounting handle that includes a notch at one free end thereof; at least one reflector element disposed on the remaining end of said mounting handle; said mounting handle being pivotally connected to one said apex adjacent said notched end; said notched end releasably and tensionally engaging said remaining apex upon pivotal movement of said handle whereby said reflector unit is positioned in upright position during the period said notched end is in engagement with said apex said reflector element being disposed at right angles to the plane of said endless frame during the period that said notched end is in engagement with said remaining apex.

2. A portable reflector unit of the character described, comprising; a flat endless support frame having opposed sides and first and second transverse supporting members extending transversely between said opposed sides; an elongate handle having a reflector element carried by one longitudinal end and having a notch provided on the remaining longitudinal end; said handle being pivoted to said first transverse frame member adjacent said notched end of said handle; said notched end of said handle releasably and tensionally engaging said second transverse support member during the period said handle is positioned at substantially right angles to the plane of said flat support frame; said reflector element being disposed at right angles to the plane of said flat support frame during the period said notched end is in engagement with said second transverse support member; said handle member being positionable in substantial parallelism with the plane of said flat support frame during the period said notched end is out of engagement with said second transverse support member.

3. The device of claim 2 further characterized by the fact that said first and second transverse support members are of V-shaped configuration in plan; the apexes of said transverse support members overlapping whereby one said apex may pivotally support said handle while the other said apex may be engaged by said notched end of said handle.

4. The device of claim 2 further characterized by the fact that said first and second transverse support members have at least a portion thereof disposed in different horizontal planes with the vertical distance between said support members being less than the distance between said notched end of said handle and the point of pivotal connection between said handle and said first transverse support member whereby said support members are spread apart during the engagement of said notched end with said second support member.

5. The device of claim 4 further characterized by the presence of cam means on said notched end of said handle; said cam means spreading said transverse support members apart whereby engagement between said notched end of said handle and said second transverse support member may be facilitated.

References Cited in the file of this patent

UNITED STATES PATENTS

| | | |
|---|---|---|
| 2,548,722 | Haigh | Apr. 10, 1951 |
| 2,735,637 | Tolbert | Feb. 21, 1956 |
| 2,929,349 | Klett | Mar. 22, 1960 |